United States Patent
Hoffjann et al.

(10) Patent No.: US 7,759,011 B2
(45) Date of Patent: Jul. 20, 2010

(54) SAFETY SYSTEM FOR REDUCING THE EXPLOSION RISK OF A FUEL TANK

(75) Inventors: Claus Hoffjann, Hamburg (DE); Andreas Westenberger, Buxtehude (DE)

(73) Assignee: Airbus Deutschland GmbH, Hamburg (DE)

( * ) Notice: Subject to any disclaimer, the term of this patent is extended or adjusted under 35 U.S.C. 154(b) by 883 days.

(21) Appl. No.: 11/560,654

(22) Filed: Nov. 16, 2006

(65) Prior Publication Data
US 2007/0111060 A1 May 17, 2007

(30) Foreign Application Priority Data
Nov. 17, 2005 (DE) .................. 10 2005 054 885

(51) Int. Cl.
 *H01M 8/00* (2006.01)
 *H01M 8/04* (2006.01)
 *H01M 8/12* (2006.01)
 *B64D 37/02* (2006.01)
(52) U.S. Cl. ................ 429/443; 429/444; 429/545; 244/135 R
(58) Field of Classification Search ............ 429/12, 429/13, 35, 34; 244/135 R
See application file for complete search history.

(56) References Cited

U.S. PATENT DOCUMENTS

| 6,117,577 A | * | 9/2000 | Wilson | ............ 429/17 |
| 2005/0008913 A1 | * | 1/2005 | Phillips et al. | ............ 429/26 |

FOREIGN PATENT DOCUMENTS

| DE | 19845955 A1 | 5/1999 |
| DE | 19821952 C2 | 11/1999 |
| DE | 10031238 B4 | 1/2002 |
| DE | 10240379 A1 | 4/2003 |
| DE | 10249588 A1 | 5/2004 |
| DE | 10356012 A1 | 6/2005 |
| JP | 2005100846 A | 4/2005 |

* cited by examiner

*Primary Examiner*—Patrick Ryan
*Assistant Examiner*—Julian Mercado
(74) *Attorney, Agent, or Firm*—Wood, Herron & Evans, L.L.P.

(57) ABSTRACT

A safety system for reducing the explosion risk of a fuel tank comprises a protective gas generating device and a delivery device for delivering the protective gas generated by the protective gas generating device into the fuel tank. The protective gas generating device (24) comprises a fuel cell system (26) having a fuel cell (28) and is configured so as to provide the delivery device (14) with a protective gas generated by the fuel cell (28) during operation of the fuel cell system (26).

12 Claims, 1 Drawing Sheet

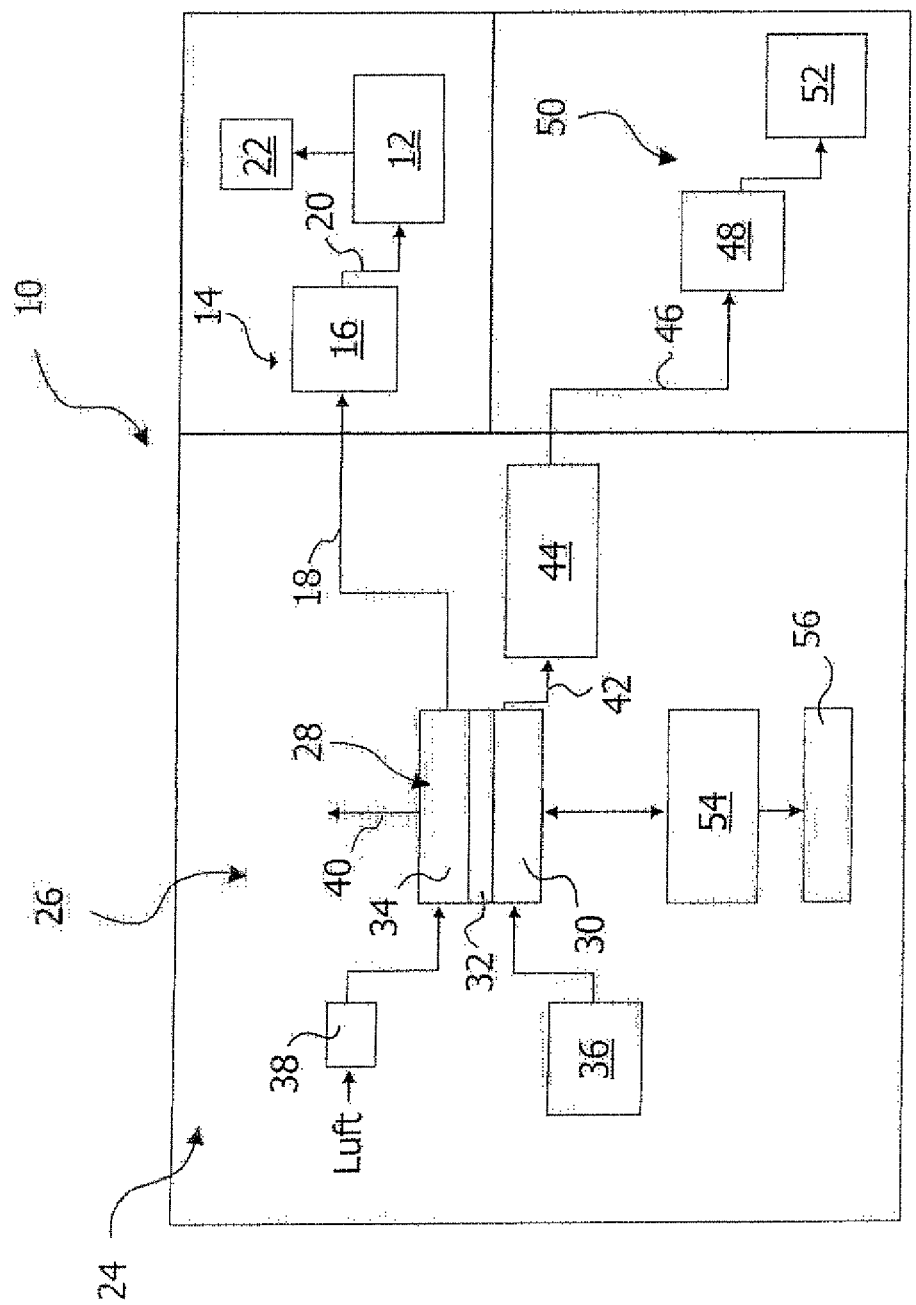
Figure

SAFETY SYSTEM FOR REDUCING THE EXPLOSION RISK OF A FUEL TANK

Technical Field

The invention relates to a safety system for reducing the explosion risk of a fuel tank, which comprises a protective gas generating device and a delivery device for delivering the protective gas generated by the protective gas generating device into the fuel tank.

BACKGROUND OF THE INVENTION

In the case of an incompletely filled fuel tank, the problem fundamentally exists that at a corresponding temperature and a corresponding pressure, an ignitable mixture of fuel gases and oxygen in air can form in the tank at an interface between the surface of the liquid fuel held in the tank and a layer of air lying above. This mixture may be ignited by a spark, which may for example be due to an electrical short circuit or the like, and cause an explosion of the fuel tank. Particularly when the fuel tank is a kerosene tank of an aircraft, such a tank explosion may have catastrophic consequences and sometimes even lead to loss of the aircraft.

Particularly for fuel tanks on board an aircraft, attempts are therefore made to counteract the risk of a tank explosion by delivering an oxygen-free or at least low-oxygen and therefore inert protective gas to an incompletely filled fuel tank, so as to prevent the formation of an ignitable mixture of fuel gases and oxygen in air. For example, nitrogen may be used as the protective gas. The protective gas to be delivered to the fuel tank, however, must be either placed in a separate storage container on board the aircraft or obtained in a comparatively elaborate way, for example by using a molecular sieve to separate nitrogen from air.

DE 100 31 238 B4 discloses a fuel cell system which comprises a gas generating system box, for example containing components of a reforming system, a peripherals box containing peripheral components, a fuel cell box and a process media supply box containing compressors and densifiers for delivering process air. In order to avoid accumulation of leakage hydrogen in the boxes of the fuel cell system, the boxes of the fuel cell system are flushed. Ambient air or exhaust gas from the fuel cell system may be used as the flushing medium.

DE 102 40 379 A1 and DE 198 45 955 A1, respectively, disclose systems for inerting aircraft tanks, in which correspondingly processed combustion exhaust gases of a turbine engine are delivered to the tanks.

JP 2005100846 A relates to a fuel cell system in which cycled exhaust gases of an oxygen electrode are delivered to a hydrogen electrode.

DE 103 56 012 A1 and DE 102 49 588 A1, respectively, disclose a fuel cell system employed on board an aircraft, which is used to generate water and energy on board the aircraft.

Lastly, the use of a PEM fuel cell on board an aircraft to substitute for a main power unit generator, an auxiliary power unit, a ram air turbine or a NiCd battery, is known from DE 198 21 952 C2.

SUMMARY OF THE INVENTION

It is an object of the invention to provide a safety system for reducing the explosion risk of a fuel tank, which makes it possible for a protective gas, intended for delivery to a fuel tank, to be obtained in a simple and efficient way and which, in particular, is suitable for use on board an aircraft.

In order to achieve the aforementioned object, a protective gas generating device of a safety system according to the invention, for reducing the explosion risk of a fuel tank, comprises a fuel cell system having a fuel cell and is configured so as to provide a protective gas, which is generated by the fuel cell during operation of the fuel cell system, to a delivery device for delivering the protective gas generated by the protective gas generating device into the fuel tank. In the present invention, the exhaust gas generated by the fuel cell during operation of the fuel cell system can be used as the protective gas and fed to the delivery device. The safety system according to the invention therefore makes it possible for the protective gas, intended for delivery to the fuel tank, to be obtained in a simple and efficient way.

The fuel cell used in the protective gas generating device of the safety system according to the invention comprises a cathode region and an anode region, which is separated from the cathode region by an electrolyte. During operation of the fuel cell, hydrogen is delivered to the anode side of the fuel cell and an oxygen-containing oxidant, for example air, is delivered to the cathode side of the fuel cell. The hydrogen molecules react on an anode catalyst provided in the anode region according to the equation

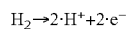

and release electrons to the electrode while forming positively charged hydrogen ions.

The H$^+$-ions formed in the anode region subsequently diffuse through the electrolyte to the cathode, where, on a cathode catalyst provided in the cathode region and typically applied onto a carbon support, they react to form water with the oxygen delivered to the cathode as well as the electrons conducted via an external electrical circuit to the cathode, according to the equation

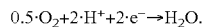

The operating temperature of the fuel cell depends on the type of electrolyte used in the fuel cell. For example, the operating temperature of a conventional polymer electrolyte membrane fuel cell is approximately 60-80° C.

As can be seen from the reaction equations above, oxygen is consumed during operation of the fuel cell. If air is delivered as an oxidant to the cathode side of the fuel cell, this air will therefore be depleted of the oxygen consumed during the cathode reaction of the fuel cell, before it leaves the cathode region of the fuel cell as an exhaust gas. The protective gas generated by the protective gas generating device of the safety system according to the invention is therefore air, depleted of oxygen which has reacted during operation of the fuel cell. The low-oxygen cathode exhaust gas of the fuel cell is sufficiently inert to prevent the formation of an ignitable gas mixture in a fuel tank, and therefore makes it possible to reliably minimise the risk of a tank explosion.

The delivery device of the safety system according to the invention, which for example comprises one or more fluid line(s) connecting the protective gas generating device to the fuel tank to be inerted, therefore preferably furthermore comprises a protective gas storage container for holding the protective gas generated by the fuel cell of the protective gas generating device. The storage container may, for example, be connected via a first fluid line to the protective gas generating device and via a second fluid line to the fuel tank to be inerted. By providing a protective gas storage container, the delivery device of the safety system according to the invention can be operated at least for a certain time independently of the protective gas generating device, so that a sufficient supply of protective gas into the fuel tank is ensured even in case of an operational interruption or a failure of the fuel cell system of the protective gas generating device.

In a preferred embodiment of the safety system according to the invention, the protective gas generating device is furthermore configured so as to supply a water supply system with water generated by the fuel cell during operation of the fuel cell system. The water supply system may, for example, be a system for supplying the passengers on board an aircraft with drinking water. In this way, also the water created as a further reaction product during operation of the fuel cell can be optimally utilised. The safety system according to the invention can therefore be operated more energy-efficiently.

In principle, it is possible to generate water of drinking water quality in a fuel cell. Prerequisites for this are a sufficient purity of the educts delivered to the fuel cell and a maximally germ-free and food-compatible configuration of the relevant components of the fuel cell system, which come in contact with the educts delivered to the fuel cell and the water generated by the fuel cell. In the safety system according to the invention, therefore, the relevant components of the protective gas generating device are preferably kept as clean, germ-free and food-compatible as possible. This ensures that the water supply system is always supplied with water of drinking water quality. The water supply system of the safety system may comprise one or more water storage containers for holding the water generated by the fuel cell of the protective gas generating device. This ensures that the water supply system can be operated at least for a certain time independently of the protective gas generating device, so that sufficient water is available for the water supply system even in case of an operational interruption or a failure of the fuel cell system of the protective gas generating device.

The protective gas generating device is preferably furthermore configured so as to supply the delivery device and/or the water supply system with energy generated by the fuel cell. In other words, in the safety system according to the invention the energy generated by the fuel cell, i.e. the electrical energy generated during operation of the fuel cell and/or the heat energy produced during operation of the fuel cell, can be delivered to the delivery device and/or to the water supply system and utilised for various purposes there.

Electrical energy generated by the fuel cell may, for example, be used to drive electrical loads in the delivery device and/or in the water supply system, for example an electrical heater, a cooling device or a pump. Heat energy generated by the fuel cell may moreover be used directly for heating purposes. The protective gas storage container and/or the water storage containers may for example be heated or cooled, for which purpose it is possible to use the electrical energy generated by the fuel cell of the protective gas generating device or, in the case of heating, even directly the heat energy generated by the fuel cell. As an alternative or in addition to this, the storage container(s) may nevertheless also be provided with corresponding insulation which, optionally even without additional heating or cooling, is capable of keeping the protective gas discharged from the fuel cell of the protective gas generating device or water discharged from the fuel cell of the protective gas generating device at the desired temperature.

The delivery device and/or the water supply system may furthermore comprise an energy store for storing the electrical energy generated by the fuel cell of the supply unit. The energy store configured in the form of a rechargeable battery, for example, is preferably electrically connected to the fuel cell of the protective gas generating device so that, when required, it can be recharged using the electrical energy generated by the fuel cell. By providing an energy store in the delivery device and/or the water supply system, electrical loads of the delivery device and/or the water supply system, for example an electrical heater, a cooling device or a pump, can be operated at least for a certain time independently of the protective gas generating device.

The protective gas generating device of the safety system according to the invention may be intended exclusively to provide the delivery device with the protective gas generated by the fuel cell during operation of the fuel cell system. As an alternative to this, however, the protective gas generating device may also be part of a separate or superordinate energy and/or water supply system and also supply other systems besides the delivery device and the water supply system, preferably systems on board an aircraft, with gas and/or water generated by the fuel cell and/or energy generated by the fuel cell.

The fuel cell used in the protective gas generating device of the safety system according to the invention is preferably a polymer electrolyte membrane fuel cell, a high-temperature polymer electrolyte membrane fuel cell being employed in a particularly preferred embodiment of the safety system according to the invention. Fundamentally, polymer electrolyte membrane fuel cells have the advantage that they are relatively simple to produce, since the membrane films used as an electrolyte are comparatively robust and easy to handle. Furthermore, the electrolyte is not consumed during operation of the fuel cell and therefore does not need to be replaced or conditioned during the operating life of the cell. what is more, polymer electrolyte membrane fuel cells have a comparatively long lifetime. Lastly, polymer electrolyte membrane fuel cells can be started up and shut down relatively simply and rapidly.

High-temperature polymer electrolyte membrane fuel cells differ from conventional polymer electrolyte membrane fuel cells by the type of electrolyte membrane used in the fuel cell, which in contrast to conventional polymer electrolyte membrane fuel cells permits elevated operating temperatures of approximately 120° C.-300° C. depending on the composition. Using a high-temperature polymer electrolyte membrane fuel cell in the safety system according to the invention has the advantage that, at the elevated operating temperature of this cell, disinfection of the water produced during the fuel cell reaction already takes place in the cell so that this water is particularly well-suited for further use in a system for supplying the passengers on board an aircraft with drinking water.

In a preferred embodiment of the safety system according to the invention, the fuel cell system of the protective gas generating device comprises a hydrogen tank connected to an anode region of the fuel cell. Ideally, the hydrogen tank is suitable for holding liquid hydrogen and may for example comprise an inner vessel with a steel or aluminium wall, which is enclosed by one or more thermally insulating layers. The inner vessel of the liquid hydrogen tank may be arranged in an outer housing of steel or aluminium, in which case the space between the inner vessel and the outer housing may be filled with materials of low thermal conductivity.

The storage temperature of liquid hydrogen is approximately −253° C., which has the advantage, particularly when using liquid hydrogen as a fuel for a fuel cell system on board an aircraft, that the hydrogen tank can be fitted in the unheated cargo area of the aircraft outside the cabin, without running the risk of freezing the fuel. Furthermore, liquid hydrogen is available with a very high purity, which has a positive effect on the quality of the water generated by reacting the hydrogen in the fuel cell.

As an alternative to this, the hydrogen tank may also be a pressure vessel suitable for storing hydrogen gas at an elevated pressure, and may for example comprise an inner container made of aluminium clad with carbon fibres and an outer jacket made of plastic.

As a further alternative, the fuel cell system of the protective gas generating device in the safety system according to the invention may also comprise a device for generating hydrogen from a hydrogen containing medium, which is connected to the anode region of the fuel cell. For example, a reforming system may be provided for generating hydrogen from hydrocarbons, for example methanol.

Preferably, the fuel cell system of the protective gas generating device furthermore comprises a device connected to a cathode region of the fuel cell, which is intended for delivering air to the cathode region of the fuel cell. This device may, for example, be an air delivery line connected to the cathode region of the fuel cell, and it may also comprise a compressor arranged in the air delivery line or a pump arranged in the air delivery line. The air delivered to the cathode region of the fuel cell may be taken in by means of the compressor or the pump, for example from the cabin of an aircraft. As an alternative to this, however, air may also be delivered to the cathode region of the fuel cell directly from the air-conditioning system of the aircraft.

In a preferred embodiment of the safety system according to the invention, the fuel cell system of the protective gas generating device furthermore comprises a condenser for condensing steam emerging from the fuel cell. Even when using a conventional polymer electrolyte membrane fuel cell in the fuel cell system of the protective gas generating device, the operating temperature of this cell is up to 80° C., so that the water generated during the fuel cell reaction is present in the form of very humid air (relative humidity 100%). When using a high-temperature polymer electrolyte membrane fuel cell, which can be operated at temperatures of up to 300° C., the water emerging from the fuel cell is present in the form of steam. The condenser connected downstream of the fuel cell converts the gaseous steam into the liquid aggregate state and at the same time provides cooling of the liquid water to the desired temperature. The liquid water can then be delivered to the water supply system for further use.

The condenser preferably comprises a condensation region and a collection region for holding the liquid water generated in the condenser, in which case the collection region may have a correspondingly large volume in order to temporarily store a certain quantity of liquid water when required. The condenser is preferably connected to a water storage container of the water supply system, so that, if required, the water storage container can be filled with the water generated in the condenser or the water temporarily stored in the collection region of the condenser.

As mentioned above, in principle it is possible to generate water of drinking water quality by a fuel cell reaction, as long as the educts delivered to the fuel cell are sufficiently pure and the components of the fuel cell system and of the condenser are sufficiently clean, germ-free and food-compatible. In order to ensure that the water delivered to the water supply system of the safety system according to the invention is of sufficiently high quality, a device for measuring the quality of the water generated by the fuel cell may be provided in the fuel cell system of the protective gas generating device. This device, which may for example be connected downstream of the condenser or integrated into the condenser, is preferably capable of testing the water generated by the fuel cell in respect of various selected constituents.

If necessary, the fuel cell system of the protective gas generating device may furthermore comprise a water purification device which, for example, by adding or removing particular components to or from the water generated by the fuel cell, ensures that the water delivered to the water supply system is of drinking water quality. The water purification device may, for example, be integrated into the condenser or configured separately therefrom.

Preferably, the fuel cell system of the protective gas generating device furthermore comprises a heat management arrangement which is used for controlling the operating temperature of the fuel cell and/or the condenser, and therefore also the temperature of the water generated by the condenser. The heat management arrangement may for example comprise a cooling system for cooling the fuel cell during operation, in which case the heat dissipated by the fuel cell may be recovered for example by providing heat exchangers in the cooling system and used for heating a hot water storage container of the water supply system. Similarly, waste heat produced in the condenser when condensing the steam generated by the fuel cell may be discharged from the condenser via a corresponding system forming a part of the heat management arrangement, and delivered to another use. Excess heat generated during operation of the fuel cell and the condenser, which cannot be delivered for further use by the heat management arrangement, may be discharged to the surroundings via an external cooler.

BRIEF DESCRIPTION OF THE DRAWING

A preferred exemplary embodiment of the invention will now be explained in more detail with reference to the appended single FIGURE, which shows a schematic representation of a safety system according to the invention.

DETAILED DESCRIPTION

In the FIGURE, a safety system 10 for reducing the explosion risk of a kerosene tank 12 on board a passenger aircraft comprises a delivery device 14 for delivering a protective gas into the kerosene tank 12 which comprises first and second fluid lines 18, 20 respectively connected to a protective gas storage container 16. A venting device 22 is provided for venting the kerosene tank 12.

A protective gas generating device 24 comprises a fuel cell system 26 having a high-temperature polymer electrolyte membrane fuel cell 28. Although only a single fuel cell 28 is shown in the FIGURE, the fuel cell system 26 has a plurality of high-temperature polymer electrolyte membrane fuel cells 28 which are stacked on one another to form a so-called fuel cell stack.

The fuel cell 28 comprises an anode region 30, which is separated from a cathode region 34 by an electrolyte 32 configured in the form of a proton-conducting polymer film which is thermally stable up to approximately 300° C. The anode region 30 of the fuel cell 28 is connected to a liquid hydrogen tank 36, which is filled with highly pure liquid hydrogen. Air, which is taken from a passenger cabin of the aircraft or an aircraft air-conditioning system, is delivered to the cathode region 34 of the fuel cell 28 by means of a compressor 38.

The educts, i.e. hydrogen and oxygen in air, delivered to the fuel cell 28 react during operation of the fuel cell 28 to form water while generating electrical energy, which is discharged from the fuel cell 28 via a line 40 and delivered to electrical loads outside the safety system 10. Since oxygen is consumed during the cathode reaction of the fuel cell 28, the air delivered as an oxidant to the cathode region 34 of the fuel cell 28 air will be depleted of the oxygen consumed during the cathode reaction of the fuel cell 28, before it leaves the cathode region 34 of the fuel cell 28 as an exhaust gas.

The low-oxygen cathode exhaust gas of the fuel cell 28 is sufficiently inert to prevent the formation of an ignitable gas mixture in the kerosene tank 12, and it is therefore sent via the first fluid line 18 into the protective gas storage container 16 and from there via the second fluid line 20 into the kerosene tank 12. By introducing the protective gas generated by the fuel cell 28 of the protective gas generating device 24 into the kerosene tank 12, the risk of a tank explosion is reliably minimised. Furthermore, providing the protective gas storage container 16 guarantees that the delivery device 14 of the safety system 10 according to the invention can be operated at least for a certain time independently of the protective gas generating device 24, so that a sufficient supply of protective gas into the kerosene tank 12 can be ensured even in case of an operational interruption or a failure of the fuel cell system 26 of the protective gas generating device 24.

As already mentioned above, besides the low-oxygen cathode exhaust gas used for inerting the kerosene tank 12, operation of the fuel cell 28 of the protective gas generating device 24 also produces water which is present in the form of steam at the operating temperature of the high-temperature polymer electrolyte membrane fuel cell 28, i.e. approximately 300° C., or in the form of a water/steam mixture owing to condensation processes in the fuel cell 28 or in lines connected to the fuel cell 28. The composition, the pressure and the temperature of the water/steam mixture emerging from the fuel cell 28 may vary according to the operating temperature of the fuel cell 28.

The fuel cell system 26 of the protective gas generating device 24 therefore furthermore comprises a condenser 44, connected via a fluid line 42 to an outlet of the fuel cell 28, in order to condense the steam emerging from an outlet of the fuel cell 28 to form liquid water. The condenser 44 has a condensation region and a collection region, the collection region being used to temporarily store the liquid water generated in the condenser 44.

The liquid water generated in the condenser 44 is delivered via a fluid line 46 to a water storage container 48 of a drinking water supply system 50. The drinking water supply system 50 is used to supply passengers on board the aircraft with drinking water. A water drainage system 52 connected to the drinking water supply system 50 ensures proper disposal of waste water.

A heat management arrangement 54 is used for controlling the operating temperature of the fuel cell 28 as well as the condenser 44, and comprises corresponding cooling systems as well as one or more heat exchanger(s) which permit further use of the heat given off by the fuel cell 28 and the condenser 44 during operation. Excess heat from the fuel cell 28 and/or the condenser 44 is discharged to the surroundings via an external cooler 56.

The invention claimed is:

1. Safety system (10) for reducing the explosion risk of a fuel tank (12), comprising:
    a protective gas generating device (24) including a fuel cell system (26) having a fuel cell (28) supplied with hydrogen and air to generate electrical energy, water, and a protective gas; and
    a delivery device (14) for delivering to the fuel tank (12) the protective gas generated by the protective gas generating device (24), wherein the protective gas is air depleted of oxygen.

2. Safety system according to claim 1, wherein the delivery device (14) comprises a protective gas storage container (16) for holding the protective gas generated by the fuel cell (28).

3. Safety system according to claim 1, wherein the protective gas generating device (24) is furthermore configured so as to supply a water supply system (50) with water generated by the fuel cell (28) during operation of the fuel cell system (26).

4. Safety system according to claim 3, wherein the water supply system (50) comprises a water storage container (48) for holding the water generated by the fuel cell (28).

5. Safety system according to claim 1, wherein the protective gas generating device (24) is furthermore configured so as to supply the delivery device (14) with energy generated by the fuel cell (28) during operation of the fuel cell system (26).

6. Safety system according to claim 1, wherein the fuel cell (28) is a high-temperature polymer electrolyte membrane (HTPEM) fuel cell.

7. Safety system according to claim 1, wherein the fuel cell system (26) comprises a hydrogen tank (36) connected to an anode side (30) of the fuel cell (28) or a device for generating hydrogen from a hydrogen containing medium, which is connected to the anode side (30) of the fuel cell (28).

8. Safety system according to claim 1, wherein the fuel cell system (26) comprises a device (38) for supplying air to a cathode side (34) of the fuel cell (28), which is connected to the cathode side (34) of the fuel cell (28).

9. Safety system according to claim 1, wherein the fuel cell system (26) comprises a condenser (44) for condensing steam emerging from the fuel cell (28).

10. Safety system according to claim 9, wherein the fuel cell system (26) comprises a heat management arrangement (54) for controlling the operating temperature of the fuel cell (28) and the condenser (44).

11. Safety system according to claim 1, wherein the fuel cell system (26) comprises a heat management arrangement (54) for controlling the operating temperature of the fuel cell (28).

12. Safety system according to claim 1, further comprising:
    an aircraft, wherein the protective gas generating device (24) and the delivery device (14) are located within the aircraft.

* * * * *